(12) United States Patent
Karam et al.

(10) Patent No.: US 7,823,026 B2
(45) Date of Patent: *Oct. 26, 2010

(54) AUTOMATIC SYSTEM FOR POWER AND DATA REDUNDANCY IN A WIRED DATA TELECOMMUNICATIONS NETWORK

(75) Inventors: Roger A. Karam, Mountain View, CA (US); Luca Cafiero, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 1334 days.

This patent is subject to a terminal disclaimer.

(21) Appl. No.: 10/961,865

(22) Filed: Oct. 7, 2004

(65) Prior Publication Data

US 2006/0092826 A1    May 4, 2006

(51) Int. Cl.
*G06F 11/00* (2006.01)
(52) U.S. Cl. .................. 714/43; 714/4; 714/14
(58) Field of Classification Search .......... 714/4, 714/43
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,331,631 A * | 7/1994 | Teraslinna | 370/392 |
| 5,386,567 A | 1/1995 | Lien et al. | |
| 5,406,260 A | 4/1995 | Cummings et al. | |
| 5,461,671 A | 10/1995 | Sakuragi et al. | |

(Continued)

FOREIGN PATENT DOCUMENTS

WO    WO 96/23377    8/1996

OTHER PUBLICATIONS

"IEEE Standard 802.3af™", IEEE Standard for Information Technology-Telecommunications and Information Exchange Between Systems-Local and Metropolitan Area Networks-Specific Requirement, IEEE the Institute of Electrical and Electronics Engineering, Inc., Jun. 18, 2003.

(Continued)

*Primary Examiner*—Yolanda L Wilson
(74) *Attorney, Agent, or Firm*—BainwoodHuang

(57) ABSTRACT

Redundancy of data and/or Inline Power in a wired data telecommunications network from a pair of power sourcing equipment (PSE) devices via an automatic selection device is provided by providing redundant signaling to/from each of the pair of PSE devices, and coupling a port of one PSE device and a redundant port of the second PSE device to respective first and second interfaces of a port of the selection device. The selection device initially selects one of the two PSE devices and communicates data and/or Inline Power to a third interface of the selection device. A powered device (PD) coupled to that third interface communicates data and/or Inline Power with the selected one of the first and second PSE device through the selection device. Upon detection of a condition, such as a failure condition, the selection device may select the other of the two interfaces.

23 Claims, 9 Drawing Sheets

U.S. PATENT DOCUMENTS

| | | | |
|---|---|---|---|
| 5,483,574 | A | 1/1996 | Yuyama |
| 5,491,804 | A | 2/1996 | Heath et al. |
| 5,531,612 | A | 7/1996 | Goodall et al. |
| 5,608,792 | A | 3/1997 | Laidler |
| 5,613,130 | A | 3/1997 | Teng et al. |
| 5,639,267 | A | 6/1997 | Loudermilk |
| 5,726,506 | A | 3/1998 | Wood |
| 5,742,513 | A | 4/1998 | Bouhenguel et al. |
| 5,758,102 | A | 5/1998 | Carey et al. |
| 5,775,946 | A | 7/1998 | Briones |
| 5,790,391 | A | 8/1998 | Stich et al. |
| 5,790,873 | A | 8/1998 | Popper et al. |
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,295,356 | B1 | 9/2001 | De Nicolo |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,701,443 | B1 | 3/2004 | Bell |
| 6,748,557 | B1 * | 6/2004 | Beardsley et al. ............. 714/43 |
| 6,762,675 | B1 | 7/2004 | Cafiero et al. |
| 6,764,343 | B2 | 7/2004 | Ferentz |
| 6,804,351 | B1 | 10/2004 | Karam |
| 6,925,578 | B2 * | 8/2005 | Lam et al. ...................... 714/4 |
| 6,938,179 | B2 * | 8/2005 | Iyer et al. ...................... 714/4 |
| 6,958,699 | B1 | 10/2005 | Karam |
| 6,986,071 | B2 | 1/2006 | Darshan et al. |
| 6,996,134 | B1 | 2/2006 | Renucci et al. |
| 6,996,458 | B2 | 2/2006 | Pincu et al. |
| 7,058,847 | B1 * | 6/2006 | Guzman et al. ................ 714/4 |
| 7,089,126 | B2 | 8/2006 | Muir |
| 7,107,358 | B2 * | 9/2006 | Vasko et al. ................ 709/249 |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 7,194,639 | B2 | 3/2007 | Atkinson et al. |
| 7,221,261 | B1 | 5/2007 | Klingensmith et al. |
| 7,272,746 | B2 * | 9/2007 | Deerman et al. ............... 714/4 |
| 7,299,368 | B2 | 11/2007 | Peker et al. |
| 7,308,612 | B1 * | 12/2007 | Bishara et al. ................ 714/43 |
| 7,455,527 | B2 | 11/2008 | Nordin et al. |
| 7,504,748 | B2 | 3/2009 | Chang et al. |
| 7,515,526 | B2 | 4/2009 | Elkayam et al. |
| 2004/0049321 | A1 * | 3/2004 | Lehr et al. ................... 700/286 |
| 2004/0073597 | A1 * | 4/2004 | Caveney et al. ............. 709/200 |
| 2004/0139371 | A1 * | 7/2004 | Wilson et al. ................. 714/43 |
| 2004/0146061 | A1 | 7/2004 | Bisceglia et al. |
| 2004/0260794 | A1 | 12/2004 | Ferentz et al. |
| 2005/0132240 | A1 | 6/2005 | Stineman et al. |
| 2005/0165032 | A1 | 7/2005 | Norman et al. |
| 2005/0197094 | A1 | 9/2005 | Darshan et al. |
| 2005/0257262 | A1 | 11/2005 | Matityahu et al. |
| 2006/0117212 | A1 * | 6/2006 | Meyer et al. ................... 714/4 |
| 2006/0239183 | A1 | 10/2006 | Robitaille et al. |

OTHER PUBLICATIONS

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-201.

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

* cited by examiner

AUTOMATIC SYSTEM FOR POWER AND DATA REDUNDANCY IN A WIRED DATA TELECOMMUNICATIONS NETWORK

STATEMENT OF RELATED CASES

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be also related to commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab the entirety of which is hereby incorporated herein by reference as is set forth fully herein.

This patent may be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may be considered to be also related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may be considered to be related to commonly owned U.S. patent application Ser. No. 10/981,203 filed on Nov. 3, 2004 and entitled "Powered Device Classification In A Wired Data Telecommunications Network" in the name of inventors John Wakerly and Roger A. Karam.

This patent may be considered to be related to commonly owned U.S. patent application Ser. No. 10/981,202 filed on Nov. 3, 2004 and entitled "PHY-Based Current Imbalance Compensation for Magnetics in a Wired Data Telecommunications Network" in the names of inventors Roger A. Karam and John F. Wakerly.

This patent may be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may be considered to be related to commonly owned U.S. Pat. No. 6,541,878 entitled "Integrated RJ-45 Magnetics with Phantom Power Provision" in the name of inventor Wael William Diab.

This patent may be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is a specific form of Inline Power and is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10*b* comprises a switch or hub 12*b* with integral power sourcing equipment (PSE) 14*b*. Power from the PSE 14*b* is injected on the two non-data carrying Ethernet twisted pairs 16*bc* and 16*bd*. Data carrying Ethernet twisted pairs 16*ba* and 16*bb* are unused in this variant for power transfer. The power from non-data carrying Ethernet twisted pairs 16*bc* and 16*bd* is conducted to powered device (PD) 22*b* for use thereby as shown. In FIG. 1C a data telecommunications network 10*c* comprises a switch or hub 12*c* without integral power sourcing equipment (PSE). Midspan power insertion equipment 24 simply passes the data signals on the two data carrying Ethernet twisted pairs 16*ca*-1 and 16*cb*-1 to corresponding data carrying Ethernet twisted pairs 16*ca*-2 and 16*cb*-2. Power from the PSE 14*c* located in the Midspan power insertion equipment 24 is injected on the two non-data carrying Ethernet twisted pairs 16*cc*-2 and 16*cd*-2 as shown. The power from non-data carrying Ethernet twisted pairs 16*cc*-2 and 16*cd*-2 is conducted to powered device (PD) 22*c* for use thereby as shown. Note that powered end stations 26*a*, 26*b* and 26*c* are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline Power is also available through techniques that are non-IEEE 802.3 standard compliant as is well known to those of ordinary skill in the art.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

Redundancy of data and/or Inline Power in a wired data telecommunications network from a pair of power sourcing equipment (PSE) devices via an automatic selection device is provided by providing redundant signaling to/from each of the pair of PSE devices, and coupling a port of one PSE device and a redundant port of the second PSE device to respective first and second interfaces of a port of the selection device. The selection device initially selects one of the two PSE devices and communicates data and/or Inline Power to a third interface of the selection device. A powered device (PD) coupled to that third interface communicates data and/or Inline Power with the selected one of the first and second PSE device through the selection device. Upon detection of a condition, such as a failure condition, the selection device may select the other of the two interfaces. The selection device may operate to select all or some of the ports of a given PSE device at the same time. The selection device may initiate a communication to a network management device or center to request service for the failed device.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
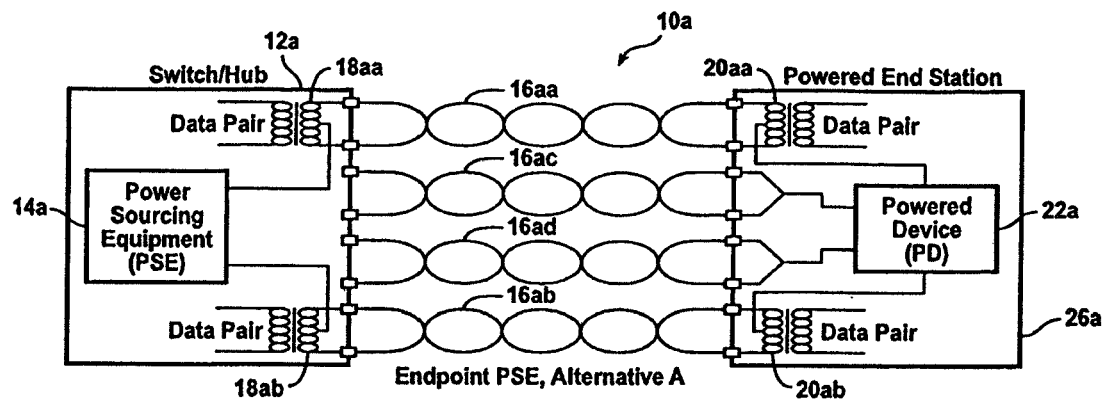
FIGS. 1A, 1B, 1C, 1D and 1E are electrical schematic diagrams of portions of data telecommunications networks in accordance with the prior art.
Figure 1B:
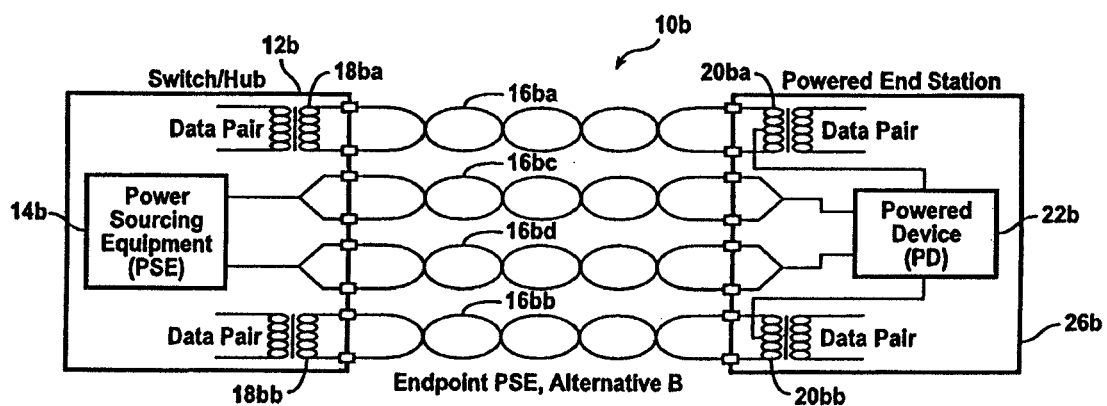
Figure 1C:
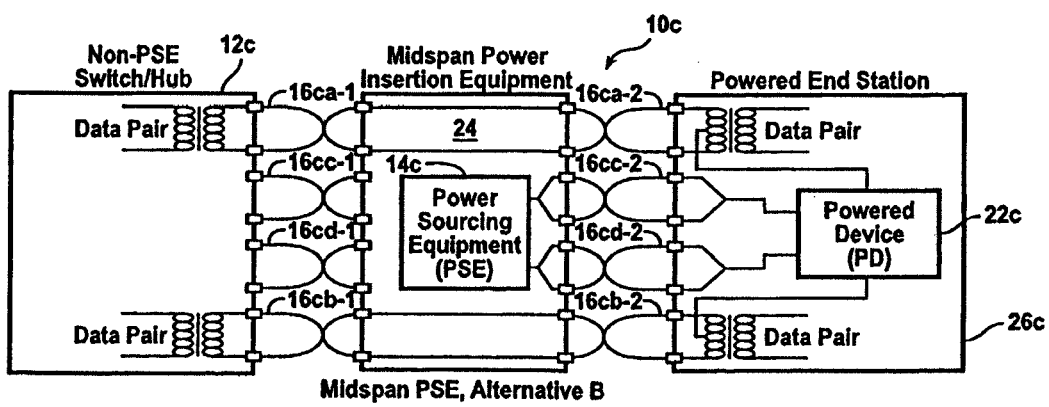
Figure 1D:
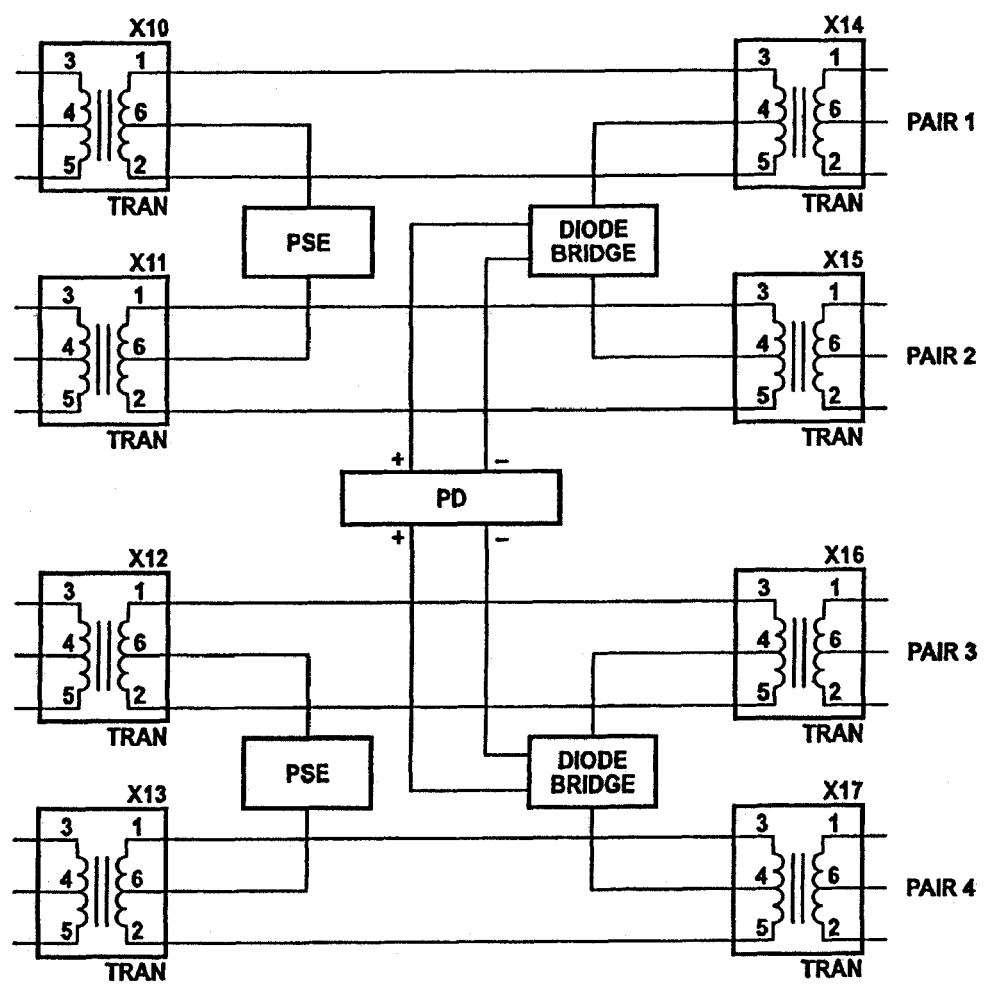
Figure 1E:
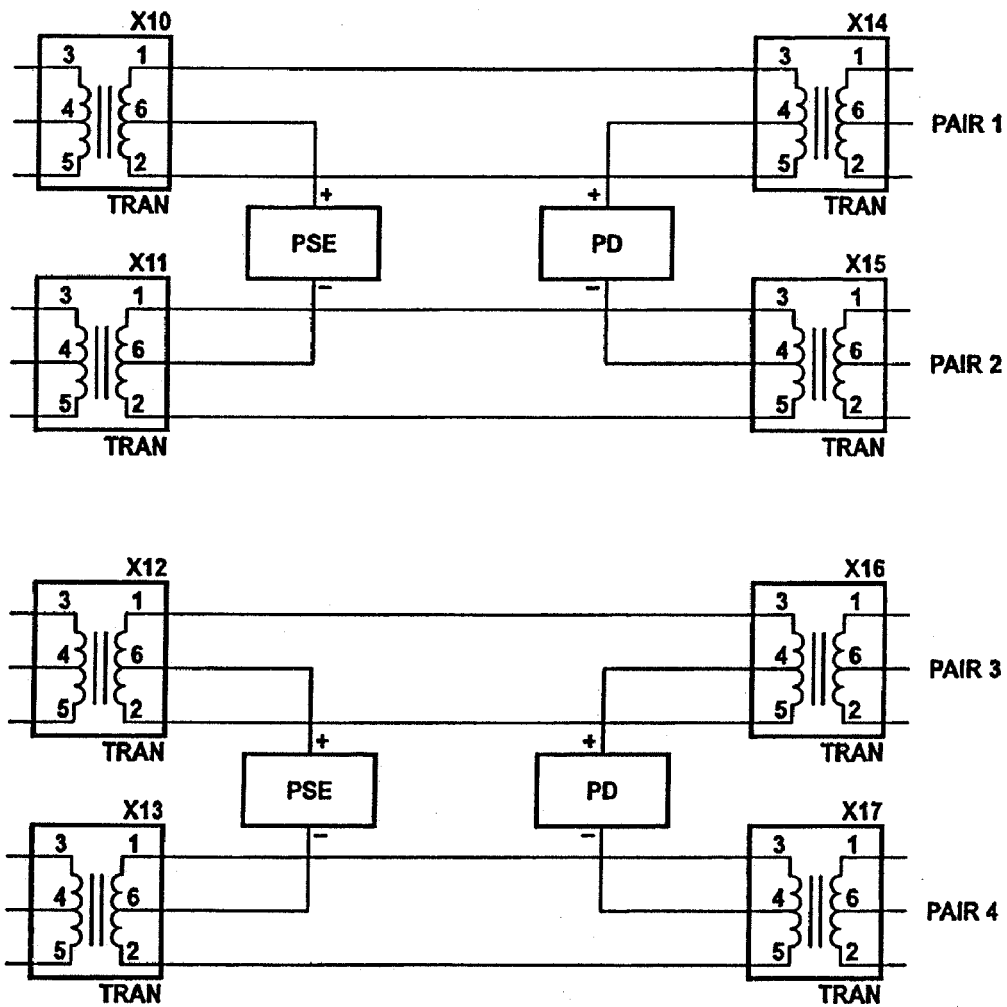

Embodiments of the present invention described in the following detailed description are directed at an automatic system for power and data redundancy in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Data communications networks have become an integral part of everyday life for many people. As important and even critical applications are carried out over such networks, the ability to provide very high reliability to such networks becomes more and more important. Some such applications now include voice over internet protocol (VOIP) telephone communications, email, computer connectivity and the like. In wired data telecommunications networks, such as well-known Ethernet networks, connectivity is provided by cables containing wire conductors. End user terminals (telephones, PDAs, laptop or desktop computers, and the like), when connected by wires (as opposed to wirelessly) are normally coupled to a switch or router by a single Ethernet cable, or via an Ethernet cable to a wall jack, which is, in turn, coupled to a switch or router via a single cable. The switches and routers are frequently connected among themselves by single Ethernet cables. If a switch, for example, were to fail or go "down", the connected devices would become inoperative, at least insofar as their network connectivity were concerned. If they were powered entirely by Inline Power, they would power down in the absence of the Inline Power. This invention is directed to providing some redundant capability in such situations.

In accordance with the present invention, redundancy of data and/or Inline Power in a wired data telecommunications network from two or more redundant telecommunications devices (such as switches, routers or the like) configured as power sourcing equipment (PSE) devices via an automatic redundancy selection apparatus (also referred to herein as a selection device) is provided by sending a redundant signal to each of the pair (or more) of the redundant data telecommunications devices (e.g., by routing essentially duplicate packets (except, e.g., for address information) to each of them, and coupling a port of one redundant telecommunications device and a redundant port of the second redundant telecommunications device (and possibly others) to respective first and second (or more) interfaces of an input port of the selection device. The selection device of the present invention operates passively and has no conventional PHYs in line with the signals being redundantly processed. The selection device initially selects one of the two inputs and passes data and/or Inline Power to an output port of the selection device. A powered device (PD) coupled (similarly PHY-lessly) to that output port receives data and/or Inline Power from the selection device. More than one redundant output could also be provided, if desired, and could operate either in parallel or on demand, i.e., if one goes down, the other could be put up). The redundant outputs would be coupled to redundant ports on the PD which would, in turn, operate off of one of the two ports—a first port and, in the event of a failure or command, the second port. Upon detection of a condition, such as a failure condition in one of the redundant telecommunications devices (or a command), the selection device may select the other of the two (or more) ports. The selection device may operate to select all of the ports at the same time (as in switching from the ports of Switch A to the ports of Switch B), or it may operate on less than all of the ports at the same time (leaving other ports unswitched). The selection device may initiate a communication to a network control point to request service for the failed device. This may be done either over the wired data telecommunications network or with an attached wireless networking device so as to be able to carry out the communication in the event of a wiring failure. The wireless networking device may be backed up with a battery or large capacitor so that it continues to be powered for some time after such a failure.

The selection device may have any number of input ports and any number of input interfaces per port. The selection device described herein will have two interfaces per port and just a single input port to avoid over complicating the disclosure. Those of ordinary skill in the art will now readily realize that the teachings herein may easily be extrapolated to cover such circumstances.

Figure 2:
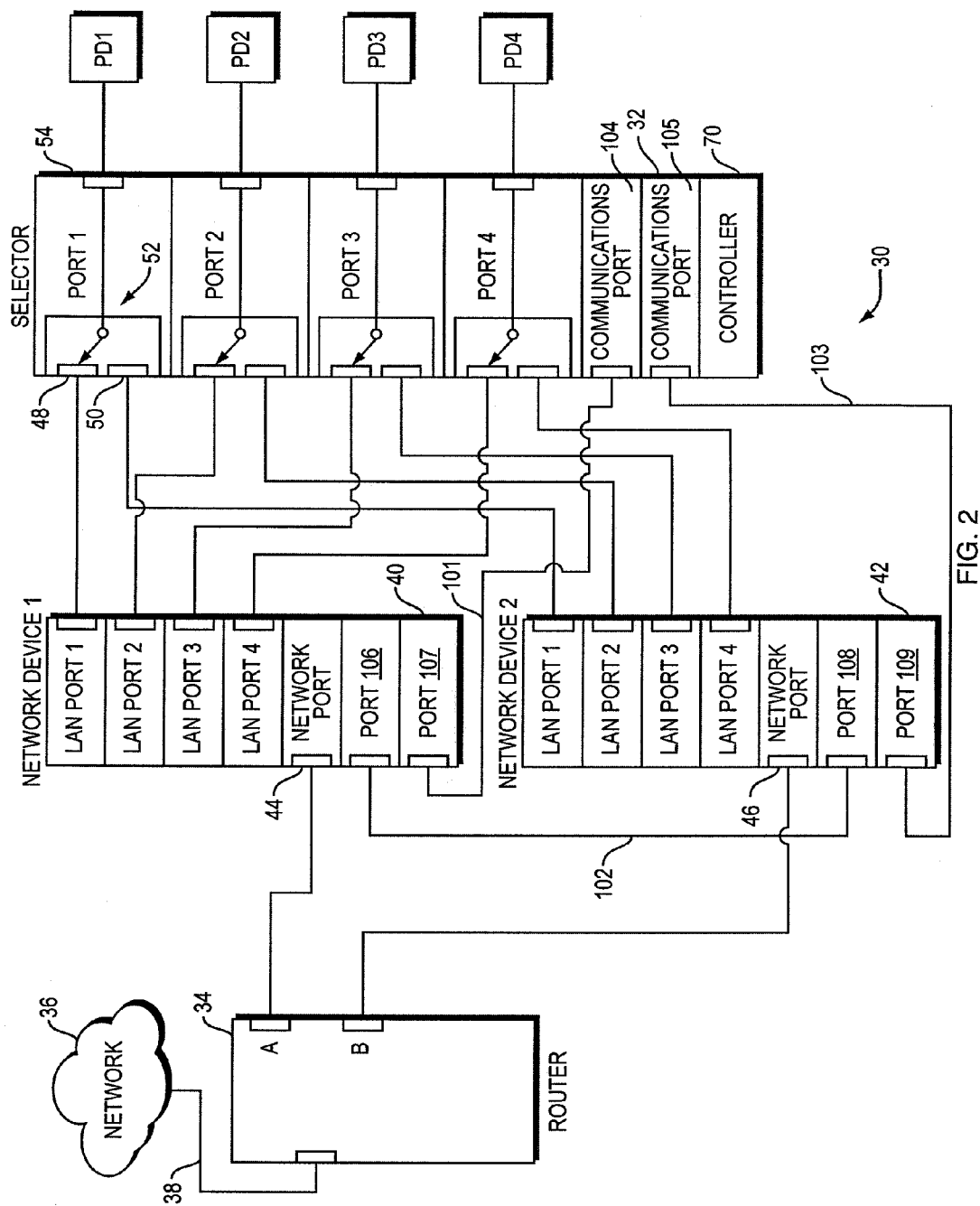
FIG. 2 is a system block diagram of a redundant network segment incorporating a selector in accordance with an embodiment of the present invention.

FIG. 2 is a system block diagram of a network segment 30 including a selector device 32 in accordance with an embodiment of the present invention. While one particular configuration is shown here, those of ordinary skill in the art will now realize that many variations on this configuration are also possible and within the scope of this invention. A router 34 couples network segment 30 to a larger network 36 such as a local area network (LAN), metropolitan area network (MAN) or wide area network (WAN) such as the Internet or a corporate Intranet or the like. The link 38 coupling router 34 to network 36 may be any suitable network link such as Ethernet, fiber, a satellite link, a terrestrial wireless link and the like. Router 34 may be any device capable of providing data redundancy to primary network device 40 and secondary network device 42. The idea here is to couple port A of router 34 to the network port 44 of primary network device 40 and port B of router 34 to the network port 46 of secondary network device 42. The packets of data sent to device 40 should be essentially the same as those going to device 42, except that the specific media access controller (MAC) address will be different in most cases (although this is not required). Each device 40 and 42 operates in an embodiment of the present invention like a network switch with a number of ports. Port 1 of selector 32 has two interfaces. A first interface 48 couples port 1 to LAN port 1 of device 40. A second interface 50 couples port 1 to LAN port 1 of device 42. In this manner, at least one port of selector 32 is coupled to a port from device 40 and a port from device 42 and each of the device 40 and 42 ports is receiving essentially the same data packets. Note that the physical embodiment of network devices 40 and 42 may be such that they are separate line cards in a larger device, preferably running off of separate power supplies for redundancy, or they can be in different physical locations, or they can be built into the same box or rack as the selection device for ease of installation.

A switch 52 associated with a redundant port of selector 32 (there may be other ports for other communications purposes—such as ports 104 and 105) is used to select among the available interfaces. In this example the switch has two states. If more than two interfaces for a port are provided, the switch will accordingly have more than two states. The output of the switch directs the selected interface to a port connection 54 with an optionally attached network device PD1 which may (or may not) be a PD (if not a PD, it might be a PSE, a legacy (non-inline-powered device), or the like). Where it is not a PD, the port must behave like a "legacy Ethernet" port (i.e., no Inline Power activity) in accordance with an embodiment of the present invention.

Note that connectivity is desirable among the network devices and between the network devices and the selection device. The connectivity is useful for providing status information and control signals where appropriate. Accordingly, extra ports such as communications ports 104 and 105 may be provided in the selection device for connection to similar ports of the network devices 40, 42, or, alternatively, or additionally, if unused pairs of the cables coupling the network device ports to the interfaces of the selection device 32 are available, they may be used for such communications. For example, in 10 Base T and 100 Base T Ethernet systems, only the 3, 6 pair of conductors and the 1, 2 pair of conductors are used to carry signals. The 4, 5 pair and the 7, 8 pair are unused. These could now easily be used to carry data between the network devices and the selection device at each port/interface. Wireless connections may alternatively be used or used as a backup for this application.

Figure 3:
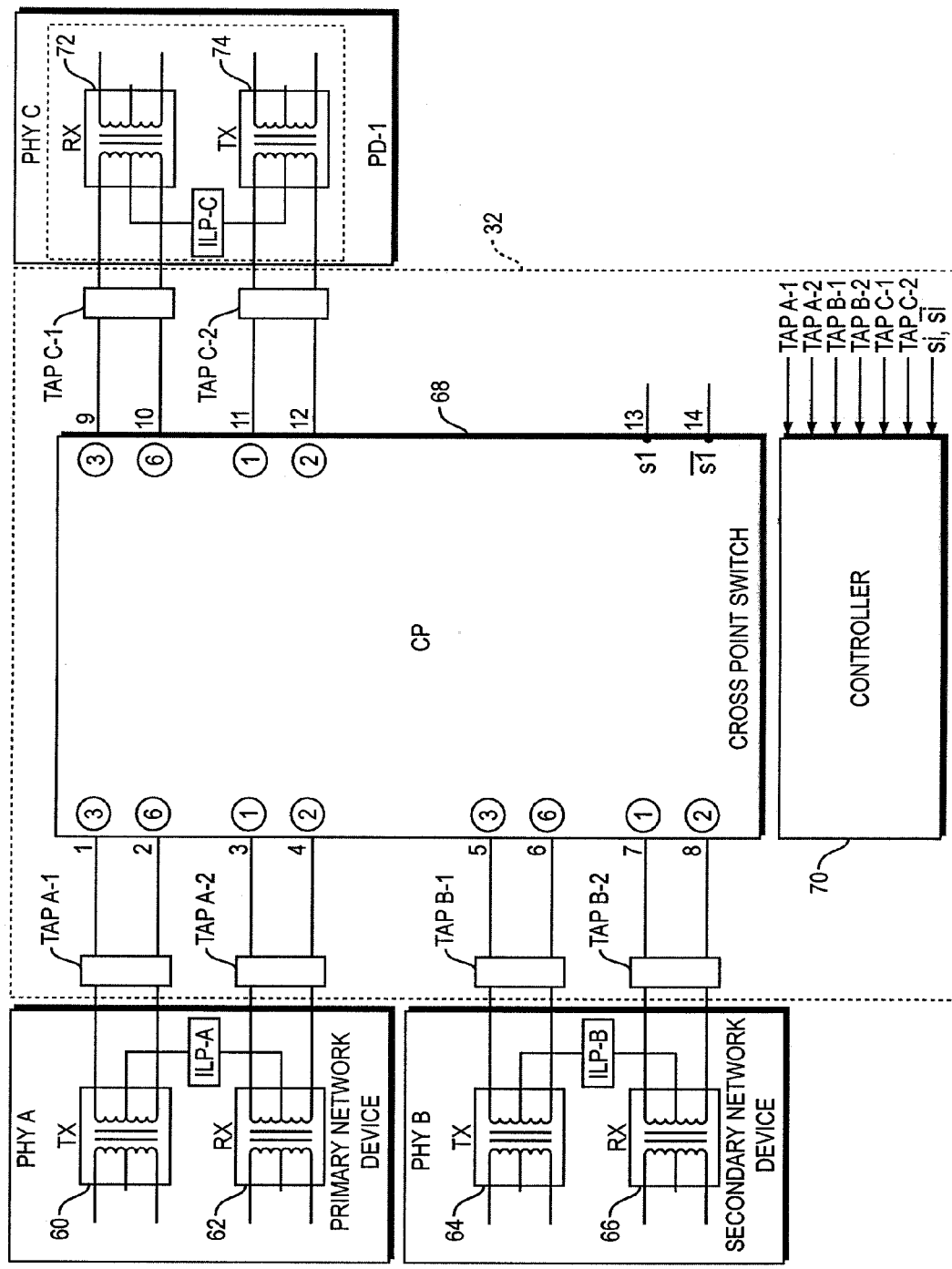
FIG. 3 is an electrical schematic/block diagram of a selector device and its connections in accordance with an embodiment of the present invention.

Turning now to FIG. 3, a more detailed block diagram of Port 1 of selector 32 is provided. In accordance with the embodiment of the invention illustrated in FIG. 3, the selector has for each of its "ports" an interface to three PHYs which are not part of the selector device, i.e., the interface simply couples wires from the selector device 32 to the three offboard PHYs: PHY A, PHY B and PHY C. PHY A and PHY B are, respectively, part of PSE 40 and PSE 42; PHY C is part of PD1. The goal is to accept and provide Inline Power and/or data from/to a selected one of PHY A and PHY B and couple the selected data/Inline Power to PHY C. In 10 Base T Ethernet and 100 Base T Ethernet each PHY has a TX (transmit) portion and an RX (receive) portion and two conductor pairs are used. In 1000 Base T Ethernet four conductor pairs are used and each may be configured for bidirectional communication (e.g., TX and RX). While only two pairs are shown in FIG. 3, those of ordinary skill in the art will now realize that it is a straightforward task to replicate the circuitry shown to handle four (or more) pairs instead of two. Two conductor wiring such as shielded or unshielded twisted pair wiring (or coaxial cable or other conventional network cabling) may be used so each TX and RX has a pair of conductors associated with it. (Note that the references herein to pair numbers and conductor numbers are for convenience only and do not correspond to the type T568B/T568A Ethernet conductor numbering and conductor pair numbering scheme).

The TX pair of PHY A is coupled to center-tapped transformer 60 (sometimes referred to as "a magnetic"), the RX pair of PHY A is coupled to center-tapped transformer (CT) 62. Details well-known to those of ordinary skill in the art such as grounds, resistors, coupling and decoupling capacitors, some of the switching and control logic and the like are left out in order to avoid overcomplicating this disclosure. Inline Power, if provided, is coupled from ILP-A block to the outboard center-taps of CTs 60 and 62. The TX pair of PHY B is coupled to CT 64 and the RX pair of PHY B is coupled to CT 66. The TX and RX pairs from CTs 60, 62, 64 and 66 are coupled to cross-point switch (CP) 68. CP 68 is discussed in more detail below, however, it serves the purpose of selecting one pair of TX and RX conductors from the two pairs of TX and RX conductors presented (i.e., it selects the pairs from PHY-A or PHY-B in accordance with this embodiment of the present invention). CP 68 is coupled to CT 72 which is, in turn, part of the RX portion of PHY C and to CT 74 which is, in turn, part of the TX portion of PHY C. This takes care of the data switching.

Inline Power is handled differently, depending upon how the crosspoint switch 68 is implemented and is discussed in more detail below.

Figure 4A:
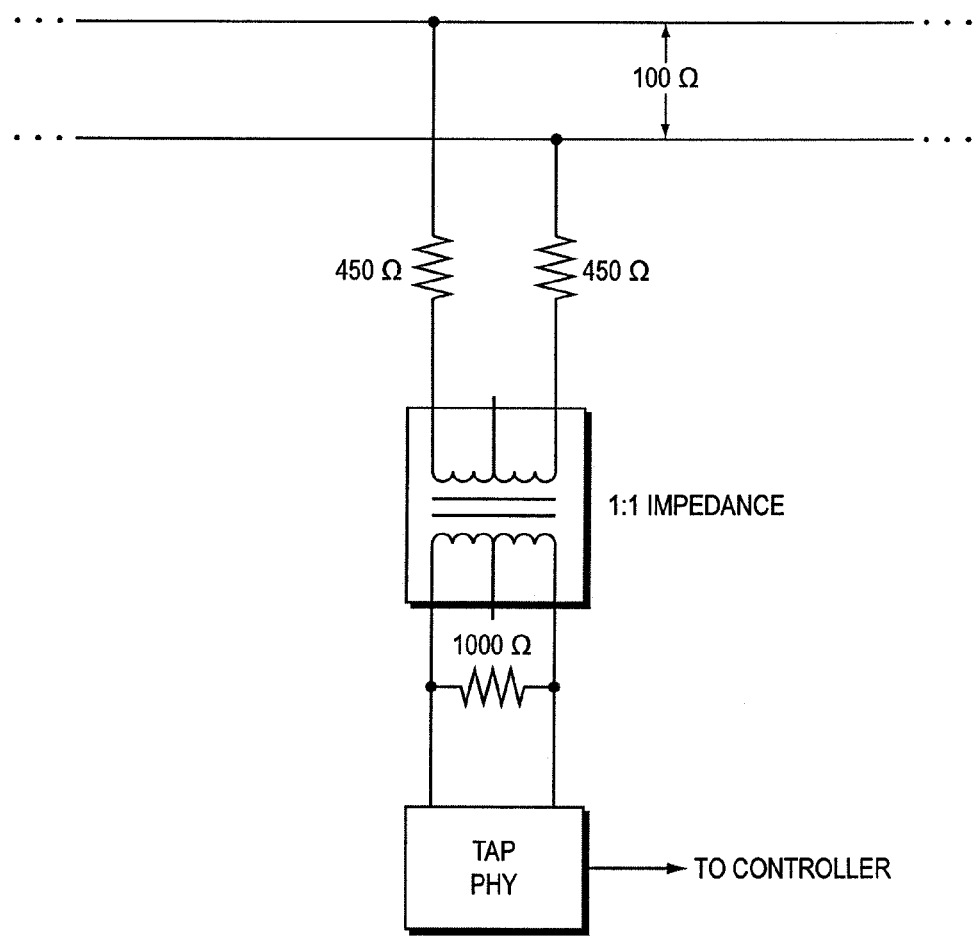
FIG. 4A is an electrical schematic diagram of a data tap for obtaining a data signal off of a pair of conductors.
Figure 4B:
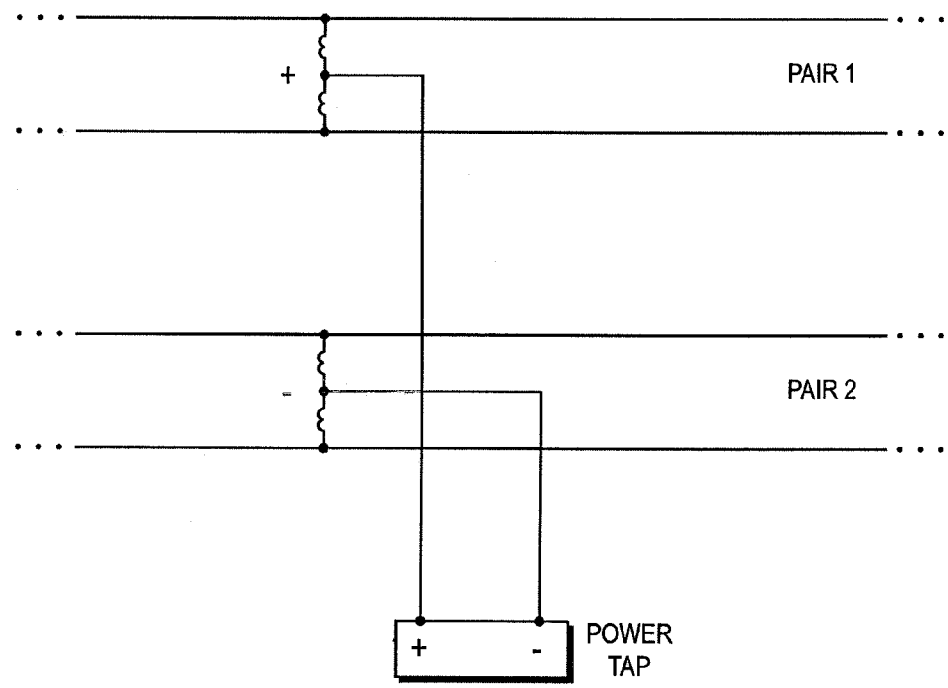
FIG. 4B is an electrical schematic diagram of a power tap for obtaining an Inline Power signal from two pairs of conductors.

Selector 32 as shown in FIG. 3 includes a tap circuit across each pair of conductors (TAP A-1, TAP A-2, TAP B-1, TAP B-2, TAP C-1 and TAP C-2). These taps may be configured as shown in FIGS. 4A and 4B (e.g., both the circuit of FIG. 4A and that of FIG. 4B may be included in the box labeled TAP A-1, and so forth, and provide status information to controller 70 over the line labeled "TAP A1", and so forth). FIG. 4A is an electrical schematic diagram of a data tap for obtaining a data signal off of a pair of conductors. FIG. 4B is an electrical schematic diagram of a power tap for obtaining an Inline Power signal from two pairs of conductors. The data tap of FIG. 4A in one embodiment of the present invention applies a 1:1 impedance ratio transformer with a 1000-ohm resistor across its output winding and each leg of the input winding coupled through a 450 ohm resistor to a 100 ohm characteristic impedance pair of conductors (e.g., Ethernet). A conventional PHY is provided in accordance with this embodiment to obtain data communications off of the pair of conductors which is provided to a controller 70 so that the controller 70 can evaluate the state of the pair of conductors (i.e., can determine if the link is operating or not). If the communications over the TX or RX pair to PHY-A are not operating, the controller may decide to switch over to PHY-B and optionally notify a network center or network control point of the possible failure of PHY-A so that remedial service may take place. The power tap of FIG. 4B operates in a conventional manner to pull an Inline Power signal off of two pairs of conductors. Each leg of the power tap is coupled through a magnetic (such as a pair of inductors (here shown as 2 mH inductors) coupled as an autotransformer or a complete CT) as shown. The power tap is then coupled to controller 70 so that the controller 70 may obtain power (if desired—not necessary if another power source is available) and determine the state of the Inline Power links. If, for example, the Inline Power link to PHY-A is not operating properly, the controller may decide to switch over to PHY-B and optionally notify a network center or network control point of the possible failure of PHY-A so that remedial service may take place. Such notification can take place via (1) common-mode communications over inline power; (2) dedicated communications links (such as Ethernet links, serial or parallel data links, or the like) such as link 101 between network device 40 and selector 32, link 102 between network device 40 and network device 42, and link 103 between network device 42 and selector 32; and (3) wirelessly using conventional wireless technology well known to those of ordinary skill in the art. Optionally, if desired, either one or both of links 101 and 103 may supply inline power to selector 32 from their respective PSEs. Controller 70 may also check the status of the inline power signal at the various ports to verify that it is within an acceptable range. Additionally, it may look for an inline power signal on the unselected interface (e.g., 50) of the ports of the selection device to verify that they are indeed plugged in properly. Controller 70, upon detecting a fault condition may then notify a network center or network control point of the fault so that corrective action may be taken.

Using the data tap of FIG. 4A is preferably done by providing one tap for each pair of conductors that is to be active (e.g., two pairs for 10 Base T and 100 Base T Ethernet and four pairs for 1000 Base T and 10000 Base T Ethernet). A predetermined packet is sent periodically in each direction by the data tap and is picked up by the data tap, transmitted to the controller and verified. If the packet is not seen, then the pair that it was supposedly transmitted over may be out of order.

Figure 5A:
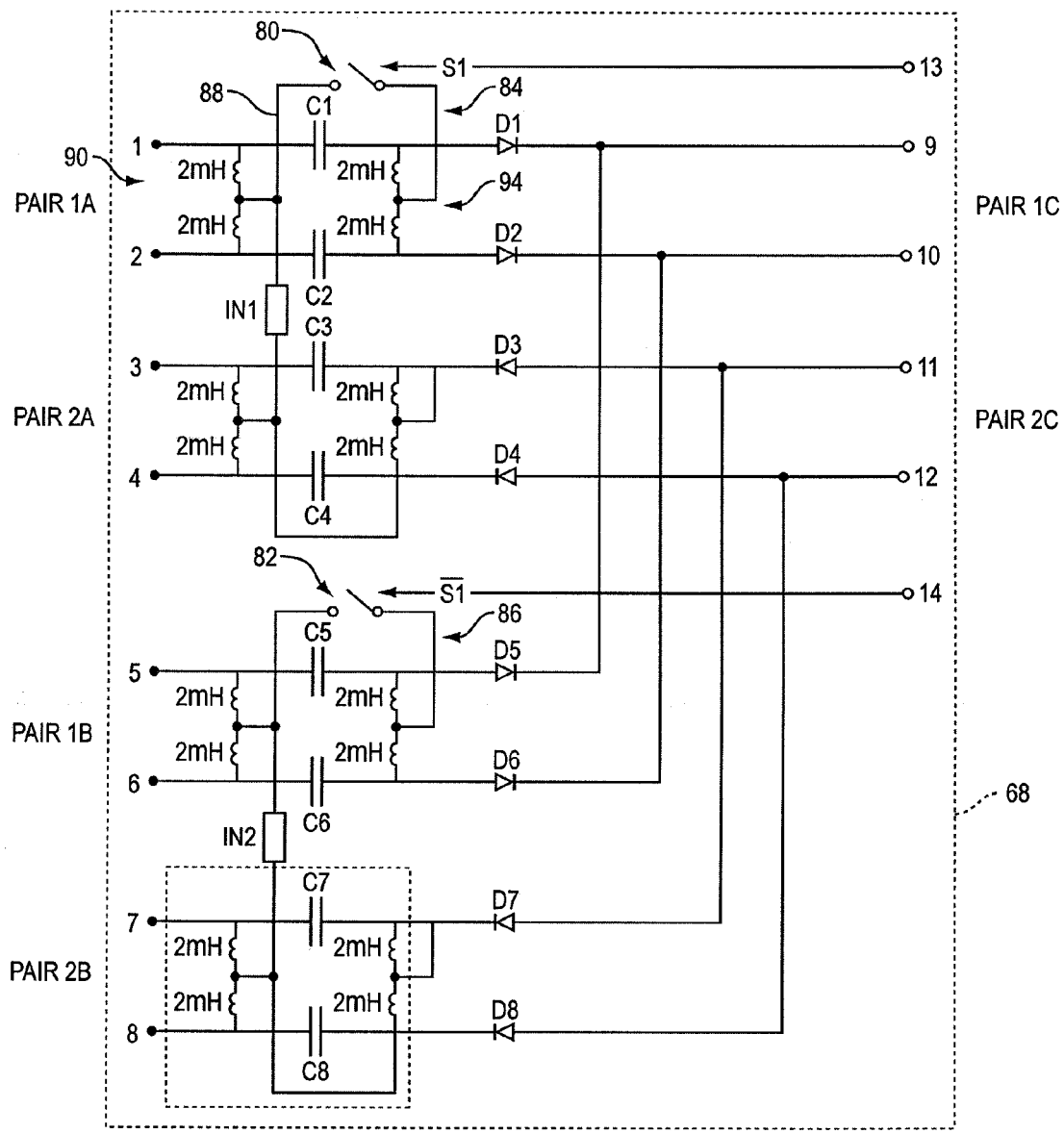
FIG. 5A is an electrical schematic diagram of an exemplar crosspoint switch for use in the selector.

FIG. 5A is an electrical schematic diagram of an exemplar crosspoint switch for use in the selector. The version of the crosspoint switch of FIG. 5A is desirable because it relies entirely or nearly entirely upon passive electronic components. In accordance with this example, the crosspoint switch 68 of FIG. 5A is controlled by signal S1 on line 13 (and S1-bar (S1's inverse)) on line 14). The states of switches 80 and 82 are controlled, respectively, by S1 and S1-bar. When switch 80 is closed (conducting) and switch 82 is open (switch 82 always has the opposite state of switch 80) then data on pairs 1A and 2A from nodes 1, 2, 3 and 4 can pass through DC blocking capacitors C1 and C2 and, if biased to conduct, through diodes D1, D2, D3 and D4 to nodes 9, 10, 11 and 12 (pairs 1C and 2C). On the other hand, if switch 80 is open (and switch 82 is closed) the data from pairs 1B and 2B is coupled, respectively, to pairs 1C and 2C while pairs 1A and 2A are no longer so coupled.

Figure 5B:
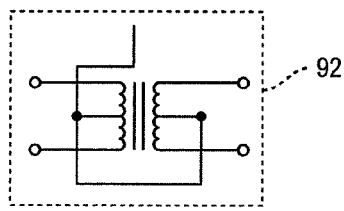
FIG. 5B is an electrical schematic diagram of an alternative circuit component for the crosspoint switch of FIG. 5A.

To bias the diodes and provide inline power across the DC blocking capacitors C1-C8, a power coupling circuit 84, 86 is provided for each two pair of conductors. Since these operate in the same way, we will discuss only power coupling circuit 84 in detail. A conductor 88 broken by switch 80 couples the autotransformer circuit 90 (or transformer circuit 92 of FIG. 5B) to autotransformer circuit 94 on the other side of capacitors C1 and C2 passing common mode power when switch 80 is closed. The same approach is used on pair 2A but no switch is required. Thus, when S1 is asserted, switch 80 closes and power from pair 1A and pair 2A is coupled to pair 1C and 2C biasing the diodes D1-D4 in the proper way to pass data and providing inline power as well.

As discussed above, diodes may be used for handling the switching functions described herein. This is possible because a diode without DC (direct current) through it is off so it acts as a high impedance. It has leakage, breakdown voltage and capacitance that can affect or "load" an AC (alternating current) signal, however those problems are not an issue as long as the diode chosen has a low on-resistance (RDS-ON) (preferably much less than 100 ohms in an Ethernet implementation—the characteristic impedance of the Ethernet cabling) and it is selected to carry the DC current requirements placed on it by the Inline Power delivery capabilities of the system. When using diodes, it is desirable to "match" the diodes for each pair of conductors, e.g., have them fabricated on the same die, so that parasitic capacitance is minimized and the signal does not become unbalanced.

In order to get PHY-A and PHY-B to provide inline power, it is necessary to provide them with an identity network which will respond to their inline power discovery signals in the proper manner so that they may provide inline power. (Recall that it is generally considered undesirable to apply inline power until an identity network confirms that the equipment is adapted to utilize the inline power). In the crosspoint switch 68 of FIG. 5A it is necessary to provide identity networks so that power will be applied by PHY-A and PHY-B. These are implemented by IN1 and IN2 shown coupled between pair 1A/2A and pair 1B/2B, respectively. IN accordance with one embodiment of the present invention identity networks IN1 and IN2 may be 25,000-ohm resistors as specified in the IEEE 802.3af standard. Other identity networks may alternatively be used depending upon the circumstances. Alternatively, the identity networks could be obviated by direct management of the inline power application by PHY-A and PHY-B.

Figure 5C:
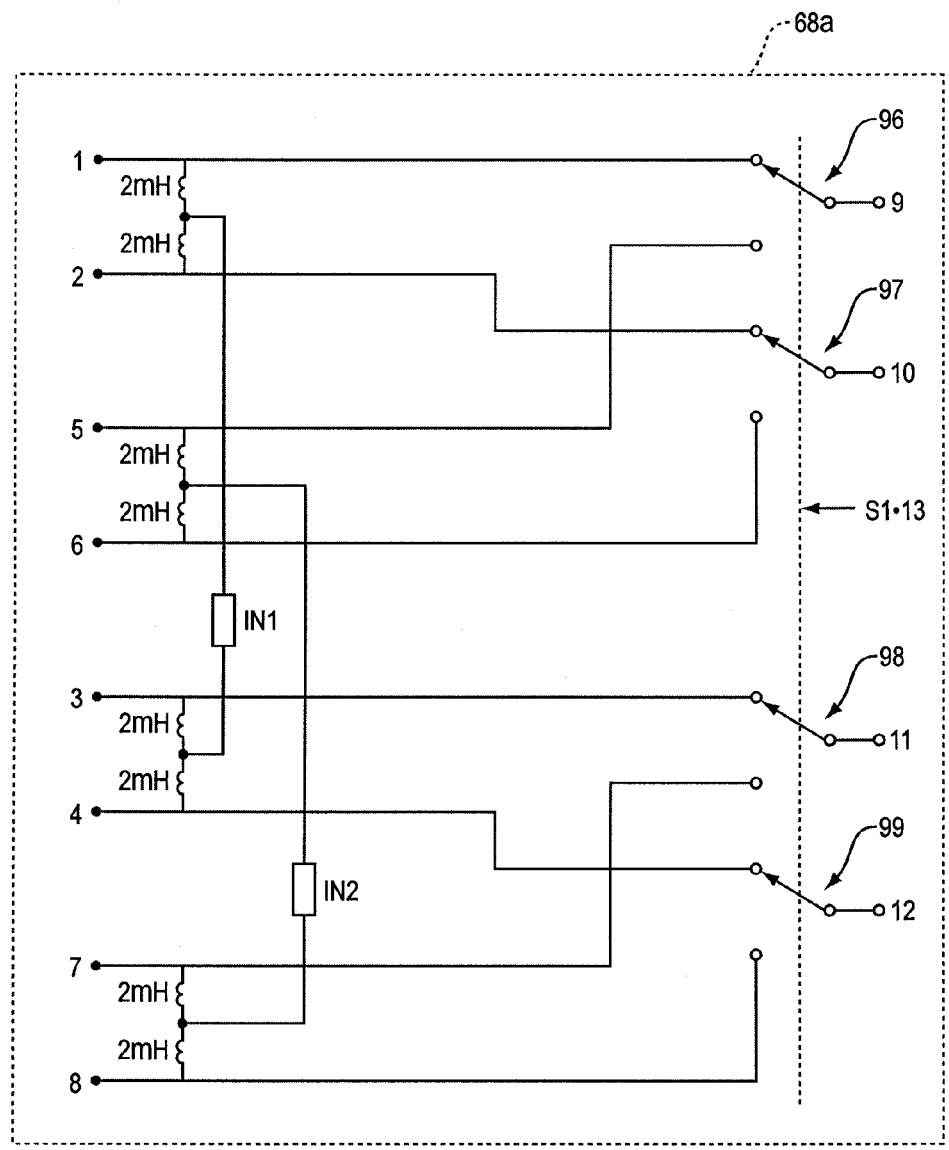
FIG. 5C is an electrical schematic diagram of an alternative crosspoint switch for use in the selector.

FIG. 5C illustrates an alternative crosspoint switch 68*a* which is implemented with switches such as relays, solid state relays, MOSFETs and the like. It operates largely in the same manner as the diode-based crosspoint switch 68 shown in FIG. 5A. One of the differences is that switches 96, 97, 98 and 99 are all controlled by a single signal and ganged so that either nodes 1, 2, 3, and 4 are selected or nodes 5, 6, 7, and 8 are selected to be coupled, respectively, to nodes 9, 10, 11 and 12. The same identity networks IN1 and IN2 are shown although, in some embodiments, they are not required because the identity networks of the PHY-C device may be sufficient to control inline power. Also note that additional identity networks may add to or substitute for identity networks IN1 and IN2, for example, in the case of Cisco® legacy power which utilizes a differential identity network to enable a Cisco® network device to provide inline power.

Where extra pairs are available (e.g., 10 Base T and 100 Base T Ethernet implementations) in a link between a transmitter and a receiver, the data tap device of FIG. 4A may serve the function of monitoring the link for the transmission of a verification packet having a known characteristic, such as a particular setting in the packet header, or the like. The verification packet would be sent periodically, say every few seconds or minutes, and when it was picked up by the data tap, that would signify that the link was good. The verification packet may be of several forms, some forms are adapted to test certain functionality and other forms test other functionality. Different data patterns or incremental data patterns in successive verification packets may be used to attempt to verify operation. For example, sending a series of verification packets in a particular order is helpful in diagnosing certain failure modes where packets get through but in an incorrect order or only the first packet gets through over and over again. If it were not picked up by the data tap within a reasonable amount of time, then the system could conclude that the link was down (e.g., bad transmitter or receiver, severed cable, or the like). In this case the system could notify a network control point such as an operations center to obtain service and, if available, switch over to a spare conductor pair, if available. The switching could be handled in any convenient manner using solid state or mechanical switching. This would serve the purpose of keeping the system operational in the even of one pair of conductors experiencing a failure.

Upon initializing the system, a boot verification process may operate as follows. The selector 32 would request the primary and secondary network devices to conduct a power on self test in a conventional manner including verifying link integrity between the network device and the selector. If both passed, then a predetermined default one of the two network devices would be selected for operation with the second in standby. If one failed, then the other would be selected for operation and, optionally, a message sent to a network control point describing the problem. Those of ordinary skill in the art will now realize that many other ways exist to operate the pair of network devices and handle failover and such other ways are intended to be within the scope of this disclosure.

While the foregoing system has been described in the context of a port having a pair of TX conductors and a pair of RX conductors, as is used in 10 Base T and 100 Base T Ethernet networking, the approach is equally applicable to networks using larger numbers of conductor pairs, such as 1000 Base T or 10000 Base T Ethernet which uses all four pairs (eight conductors) and can simply be implemented by doubling up on the circuitry shown in FIGS. 3 and 5A, for example.

It should be noted that in accordance with embodiments of the present invention, it is contemplated that the selection device described herein may be configured so that it is disposed nearby an end device such as a PD, or built into such an end device. It may also be disposed at any other location between the end device and the PSE devices. Those of ordinary skill in the art will now recognize that it may be built into the same box containing the two PSEs, into a box containing one of the PSEs, or the like. Also note that while the above disclosure details a configuration having two PSEs one selector and one PD, those of ordinary skill in the art having the benefit of this disclosure will now readily appreciate that it could be used in a situation where there is a single or multiple PSEs and two (or more) PDs.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method for providing redundancy to a port of a wired data telecommunications network, the method comprising:

coupling a first interface of a first port of a redundancy selection device to a first port of a first data telecommunications device;

coupling a second interface of the first port of the redundancy selection device to a first port of a second data telecommunications device;

except for the portions of signals unique to the first data telecommunications device and the second data telecommunications device, providing identical data signals to the first port of the first data telecommunications device and to the first port of the second data telecommunications device at substantially the same time;

coupling data and/or power received over the first interface of the first port of the redundancy selection device to provide data and/or power to a third interface of the first port of the redundancy selection device;

detecting a failure in the flow of data and/or power from the first data telecommunications device; and activating the redundancy selection device in response to said detecting to subsequently use data and/or power received over the second interface of the first port of the redundancy selection device to provide data and/or power from the second data telecommunications device to the third interface.

2. The method of claim 1, wherein:
said detecting detects a failure in the flow of data and/or power between the first interface of the first port of the redundancy selection device and the first port of the first data telecommunications device.

3. The method of claim 2, further comprising:
powering the redundancy selection device with inline power obtained from at least one of the first data telecommunications device and second data telecommunications device.

4. The method of claim 3, further comprising:
notifying a network control point of said detecting.

5. The method of claim 4, wherein said notifying is performed using the wired data telecommunications network to send a message from the redundancy selection device through at least one of the first data telecommunications device and the second data telecommunications device.

6. The method of claim 4, wherein said notifying is performed using a wireless telecommunications link from the redundancy selection device to a wireless node coupled to the wired data telecommunications network, and from the node to the network control point.

7. The method of claim 1, wherein:
providing identical data signals to the first port of the first data telecommunications device and to the first port of the second data telecommunications device comprises sending data signals to each of the first port of the first data telecommunications device and the first port of the second data telecommunications device, the data signals sent to the first port of the second data telecommunications device configured as duplicates of the data signals sent to the first port of the first data telecommunications device;

coupling data and/or power received over the first interface of the first port of the redundancy selection device to provide data and/or power to a third interface of the first port of the redundancy selection device further comprises, prior to coupling data and/or power, receiving data signals and/or power from the first port of the first data telecommunications device via the first interface of the first port of the redundancy selection device; and activating the redundancy selection device in response to said detecting to subsequently use data and/or power received over the second interface of the first port of the redundancy selection device to provide data and/or power to the third interface comprises activating the redundancy selection device, in response to said detecting, to receive the redundant data signals and/or power from the first port of the second data telecommunications device via the second interface of the first port of the redundancy selection device to provide data and/or power to the third interface.

8. The method of claim 7, wherein activating the redundancy selection device in response to said detecting to subsequently use data and/or power received over the second interface of the first port of the redundancy selection device to provide data and/or power to the third interface further comprises activating a switch of the redundancy selection device, in response to detecting, to deselect the first interface of the first port of the redundancy selection device and the first port of a first data telecommunications device and to select the second interface of the first port of the redundancy selection device to receive the redundant data signals and/or power from the first port of the second data telecommunications device via the second interface of the first port of the redundancy selection device and to provide the redundant data signals and/or power to the third interface.

9. The method of claim 1, wherein:
coupling the first interface of the first port of the redundancy selection device to the first port of the first data telecommunications device comprises coupling the first interface of the first port of the redundancy selection device to a first port of a first power sourcing equipment device; and coupling the second interface of the first port of the redundancy selection device to the first port of the second data telecommunications device comprises coupling the second interface of the first port of the redundancy selection device to a first port of a second power sourcing equipment device.

10. The method of claim 9, comprising coupling the third interface of the first port of the redundancy selection device to a powered device to provide data and power to the powered device.

11. The method of claim 1, wherein activating the redundancy selection device comprises activating a set of passive electronic components associated with the redundancy selection device, the set of passive electronic components having a first switch associated with the first port of the redundancy selection device and a second switch associated with the second port of the redundancy selection device the first switch having an operating state that opposes the operating state of the second switch.

12. The method of claim 1, wherein:
the first data telecommunications device is configured as a first power sourcing equipment (PSE) device;
the second data telecommunications device is configured as a second PSE device;
wherein detecting a failure in the flow of data and/or power from the first data telecommunications device includes detecting a loss of power that originates from the first PSE device and is destined for the third network device, the third network device configured as a powered device (PD); and
wherein activating the redundancy selection device in response to said detecting to subsequently use data and/or power received over the second interface of the first port of the redundancy selection device to provide data and/or power from the second data telecommunications device to the third interface includes restoring power to the PD with power from the second PSE device.

13. A redundancy selection apparatus for providing redundancy to a port of a wired data telecommunications network, the apparatus comprising:

means for coupling a first interface of a first port of the apparatus to a first port of a first data telecommunications device;

means for coupling a second interface of the first port of the apparatus to a first port of a second data telecommunications device;

means for coupling data and/or power received over the first interface of the first port of the apparatus to provide data and/or power to a third interface of the first port of the apparatus;

means for providing identical data signals, excepting portions of signals unique to the first data telecommunications device and the second data telecommunications device, to the first port of the first data telecommunications device and to the first port of the second data telecommunications device at substantially the same time;

means for detecting a failure in the flow of data and/or power from the first data telecommunications device; and means for activating the apparatus in response to a failure detection by said means for detecting to subsequently use data and/or power received over the second interface of the first port of the apparatus to provide data and/or power from the second data telecommunications device to the third interface.

14. The apparatus of claim 13, wherein:
said failure detection means operates to detect a failure in the flow of data and/or power between the first interface of the first port of the redundancy selection device and the first port of the first data telecommunications device.

15. The apparatus of claim 14, further comprising
means for powering the apparatus with inline power obtained from at least one of the first data telecommunications device and second data telecommunications device.

16. The apparatus of claim 15, further comprising:
means for notifying a network control point of a failure detection by said means for detecting.

17. The apparatus of claim 16, wherein said means for notifying operates by using the wired data telecommunications network to send a message from the apparatus through at least one of the first data telecommunications device and the second data telecommunications device.

18. The apparatus of claim 16, wherein said means for notifying operates by using a wireless telecommunications link from the apparatus to a wireless node coupled to the wired data telecommunications network.

19. The apparatus of claim 13, wherein:
the first data telecommunications device is configured as a first power sourcing equipment (PSE) device;
the second data telecommunications device is configured as a second PSE device;
means for detecting a failure in the flow of data and/or power from the first data telecommunications device includes means for detecting a loss of power that originates from the first PSE device and is destined for the third network device, the third network device configured as a powered device (PD); and
means for activating the apparatus in response to a failure detection by said means for detecting to subsequently use data and/or power received over the second interface of the first port of the apparatus to provide data and/or power from the second data telecommunications device to the third interface includes means for restoring power to the PD with power from the second PSE device.

20. A system for providing redundancy for a port of a wired data telecommunications network, the system comprising:
a redundancy selection circuit having at least a first port, said port having a first interface for communicating with a first telecommunications device and a second interface for communicating with a second telecommunications device, and a third interface;
a controller operable to:
set an initial mode of operation for the system wherein the system couples signals to and from the third interface of the redundancy selection device to the first interface of the first port of the redundancy selection device;
detect a failure in Inline Power and/or data flowing to or from the first data telecommunications device through the first interface;
responsive to said detection of a failure, reconfigure to couple signals to and from the third interface of the redundancy selection device to the second interface of the first port of the redundancy selection device to provide Inline Power and/or data from the second data telecommunications device to the third interface; and
a network device coupled to the redundancy selection circuit via a first port of the first telecommunications device and via a first port of the second network telecommunications device and configurable to, except for the portions of signals unique to the first data telecommunications device and the second data telecommunications device, provide identical data signals to the redundancy selection circuit via the first port of the first data telecommunications device and via the first port of the second data telecommunications device at substantially the same time.

21. The system of claim 20, wherein:
the first data telecommunications device is configured as a first power sourcing equipment (PSE) device;
the second data telecommunications device is configured as a second PSE device;
when detecting a failure in Inline Power and/or data flowing to or from the first data telecommunications device through the first interface, the controller Is configured to detect a loss of power that originates from the first PSE device and is destined for the third network device, the third network device configured as a powered device (PD); and
when reconfiguring to couple signals to and from the third interface of the redundancy selection device to the second interface of the first port of the redundancy selection device to provide Inline Power and/or data from the second data telecommunications device to the third interface, the controller Is configured to restore power to the PD with power from the second PSE device.

22. A method for operating a selector device coupled over a first link to a first redundant network device and over a second link to a second redundant network device, the method comprising:
causing the first redundant network device to carry out a self-diagnosis test;
causing the second redundant network device to carry out a self-diagnosis test;
checking the links between the first redundant network device and the selector device;
checking the links between the second redundant network device and the selector device;

determining if the first redundant network device or its links to the selector device have a failure condition and/or if the second redundant network device or its links to the selector device have a failure condition, responsive to said determining, notifying a network control center if a failure condition is detected; and choosing one of the first redundant network device and the second redundant network device to be active based upon it not having a failure condition associated with it or its links to the selector device, and, in the absence of any failure condition, choosing one of the first redundant network device and the second network device to be active based upon a predetermined default setting.

23. A system for operating a selector device coupled over a first link to a first redundant network device and over a second link to a second redundant network device, the system comprising:

means for causing the first redundant network device to carry out a self-diagnosis test;

means for causing the second redundant network device to carry out a self-diagnosis test;

means for checking the links between the first redundant network device and the selector device;

means for checking the links between the second redundant network device and the selector device;

means for determining if the first redundant network device or its links to the selector device have a failure condition and/or if the second redundant network device or its links to the selector device have a failure condition;

responsive to said means for determining, means for notifying a network control center if a failure condition is detected; and means for choosing one of the first redundant network device and the second redundant network device to be active based upon it not having a failure condition associated with it or its links to the selector device, and, in the absence of any failure condition, choosing one of the first redundant network device and the second network device to be active based upon a predetermined default setting.

* * * * *